Jan. 31, 1967   M. V. SANDEN   3,300,859
DENTAL MIRROR
Filed Jan. 15, 1964
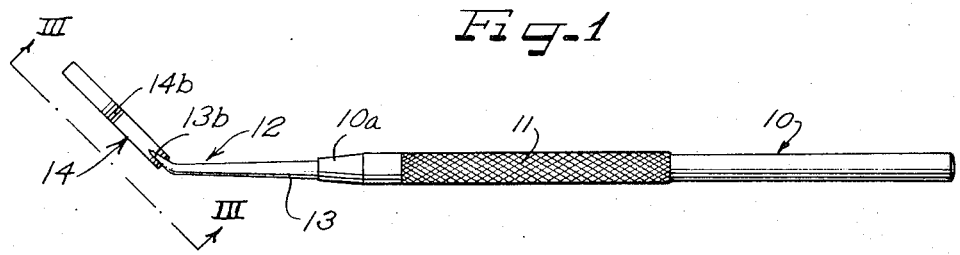
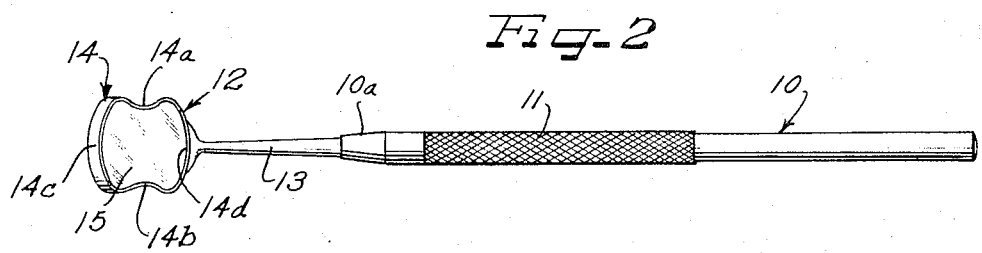
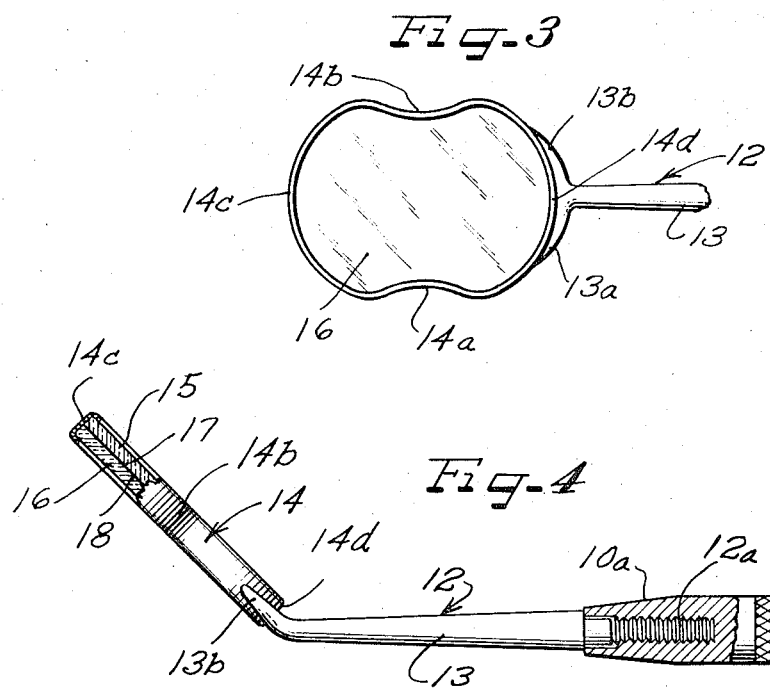
INVENTOR.
Milton V. Sanden
BY
ATTORNEYS

United States Patent Office 3,300,859
Patented Jan. 31, 1967

3,300,859
DENTAL MIRROR
Milton V. Sanden, 1404 Galena St.,
Aurora, Colo. 80010
Filed Jan. 15, 1964, Ser. No. 337,807
2 Claims. (Cl. 32—69)

This invention relates generally to dental mirrors.

It is an object of the present invention to provide a dental mirror which is substantially more effective and comfortable than the conventional mirror and yet which is substantially as simple and economical as the conventional mirror.

An important feature of the invention resides in the provision of a dental mirror having substantial arcuate indentations at the upper and lower margins thereof so as to enable a more comfortable separation between the upper and lower teeth when the mirror is inserted therebetween. The mirror proper is preferably of the same simplicity otherwise as the conventional mirror so as to be readily manipulated while in the mouth of the dental patient. Preferably, the mirror has a reflective surface at each of the opposite sides thereof so that the instrument may be used simultaneously for retracting portions of the mouth wall and viewing the regions of the teeth adjacent thereto. The contour of the mirror with the indentations at the upper and lower portions thereof also facilitates the use of the mirror in retracting the corner portions of the mouth wall and provides for increased comfort of the patient during such use of the mirror.

Other objects, features and advantages of the present invention will be apparent from the following detailed description taken in connection with the accompanying drawings in which:

FIGURE 1 is a top plan view of a dental mirror in accordance with the present invention;

FIGURE 2 is a side elevational view of the dental mirror of FIGURE 1;

FIGURE 3 is a fragmentary enlarged elevational view taken as indicated by the line III—III in FIGURE 1; and FIGURE 4 is a fragmentary enlarged plan view similar to FIGURE 1 with portions of the mirror and handle broken away and in section.

The dental mirror shown in FIGURES 1 through 4 comprises a handle 10 provided with a knurled gripping portion 11 and a detachable mirror part 12. As indicated in FIGURE 4 the mirror part 12 may have external threads 12a threadedly engaging with a portion 10a of the handle.

The mirror part 12 comprises a stem 13 suitably secured to a mirror frame 14. The mirror frame 14 may extend at the conventional obtuse angle relative to the stem 13. The mirror frame 14 may have secured therein a pair of mirror elements 15 and 16 as best seen in FIGURE 4. Each mirror element may comprise a reflector which can be made of glass or other transparent material, and the inner faces of the mirror elements are provided with coatings or backings as indicated at 17 and 18 in FIGURE 4 of a reflecting substance, such as quick silver or the like. By way of example, the mirror elements 15 and 16 may be disposed within the frame 14 in back to back relation with the coated surfaces 17 and 18 abutting one another.

As best seen in FIGURE 3, the mirror frame 14 is provided with upper and lower indentations 14a and 14b and the mirror elements 15 and 16 have corresponding indentations.

Preferred dimensions for the illustrated embodiment are as follows: overall length 175 millimeters, length of handle 10—121 millimeters; length of stem 13 which extends from handle 10, approximately 29 millimeters; length of mirror frame 14—25 millimeters. The mirror frame preferably comprises end portions 14c and 14d which as viewed in FIGURE 3 are circular arcs having a radius of 9 millimeters. The mirror face as viewed in FIGURE 3 may have a maximum length dimension of 23 millimeters and a minimum height dimension between frame portions 14a and 14b of 14 millimeters. The indentations 14a and 14b each has a radius of 9 millimeters and smoothly merges with the end arcs 14c and 14d as indicated. By way of example, the branch portions 13a and 13b of stem 13 may be soldered to the mirror frame at the circular arc section 14d thereof. The stem 13 may have a minimum diameter of 2.5 millimeters and a maximum diameter of 3.5 millimeters. The thread external diameter may be 2.5 millimeters. The threaded portion 12a of the mirror part 12 may be integral with the stem 13 and have a length of 13 millimeters so that the overall length of the stem including the threaded part 12a may be 42 millimeters measured to the mid point of frame portion 14d.

The preferred mirror in accordance with the illustrated embodiment is thus of highly simple and economical construction and yet achieves the important advantages of the present invention particularly in providing for a substantially reduced vertical dimension at the central part of the mirror in conjunction with substantially semi-circular mirror sections at opposite sides of the reduced height portion of the mirror. The mirror thus accommodates a comfortable separation between the upper and lower teeth in conjunction with entirely adequate viewing surfaces, and further greatly facilitates and makes more comfortable the use of the mirror in retracting portions of the mouth wall in order to expose the less easily accessible teeth. In retracting the mouth wall, the mirror can be used as a hook, with the mirror element 15 of the instrument engaging at a corner of the mouth, for example, while the opposite reflective surface of the instrument provided by mirror element 16 is simultaneously used for viewing. The indented portions 14a and 14b in this use provide for a secure engagement with the mouth wall and one which is relatively comfortable because of the minimum height dimension of the mirror at the region of the indentations 14a and 14b. The mirror is symmetrical with respect to a horizontal plane and is of a simple compact construction so as to be capable of rotation on its axis while within the mouth of the patient. Thus, the mirror achieves the unique advantages of the present invention without the introduction of disadvantages as compared with the conventional dental mirror.

The portions of the mirror part 12 other than the stem 13 and threaded portion 12a will herein be termed the mirror assembly, and it will be understood that this term refers to all of the mirror which is attached to the stem and which is inserted into the mouth of the patient. In the illustrated preferred embodiment, the overall height dimension of the mirror assembly at each side of the indentations 14a, 14b is 19 millimeters and the maximum overall length of the mirror assembly is 25 millimeters. The minimum overall height dimension of the mirror assembly is about 16 millimeters. The mirror assembly forms an angle with the stem 13 of approximately 135°. The thickness of the mirror assembly is approximately 2 millimeters. It will be observed that the mirror part 12 consists essentially of the stem 13 and the mirror assembly secured at the end thereof, the mirror assembly including in the illustrated embodiment the frame 14 and one or more mirror elements such as 15 and 16. The threaded portion 12a when integral with or fixed to the stem part 13 may be considered as part of the stem.

It will be apparent that many modifications and variations may be effected without departing from the scope of the novel concepts of the present invention.

I claim as my invention:

1. A dental mirror comprising a mirror part consisting essentially of a stem and a mirror assembly secured to said stem, said mirror assembly having at least one reflecting surface and having arcuate indentations at the upper and lower margins thereof centrally of said reflecting surface, said mirror assembly having a maximum overall length dimension of about 25 millimeters, a minimum height dimension of about 16 millimeters which minimum height dimension is located centrally of the reflecting surface, and having maximum height dimensions at each side of said arcuate indentations each of about 19 millimeters.

2. A dental mirror comprising a mirror part consisting essentially of a stem and a mirror assembly secured to said stem, said mirror assembly having reflecting surfaces at the opposite sides thereof and having arcuate indentations at the upper and lower margins thereof centrally of the reflecting surfaces, said mirror assembly extending at an angle of approximately 135° to the stem, having a maximum overall length dimension of about 25 millimeters, a minimum height dimension of about 16 millimeters which minimum height dimension is located centrally of the reflective surfaces and maximum height dimensions at each side of said arcuate indentations of about 19 millimeters, the end portions of the mirror assembly each having a radius of about 9 millimeters and the indentations each having a radius of about 9 millimeters.

References Cited by the Examiner

UNITED STATES PATENTS

| | | | |
|---|---|---|---|
| 548,817 | 10/1895 | Platt | 32—69 |
| 2,525,181 | 10/1950 | Ransdell | 32—69 |
| 2,574,217 | 11/1951 | Lundgren et al. | 32—69 |
| 2,831,480 | 4/1958 | Milano | 32—69 |

FOREIGN PATENTS 437,394    10/1935    Great Britain.

RICHARD A. GAUDET, *Primary Examiner.*

J. W. HINEY, Jr., *Assistant Examiner.*